No. 738,415. PATENTED SEPT. 8, 1903.
J. N. DAGES.
CUSHION TIRE FOR VEHICLE WHEELS.
APPLICATION FILED APR. 18, 1903.
NO MODEL.
2 SHEETS—SHEET 2.
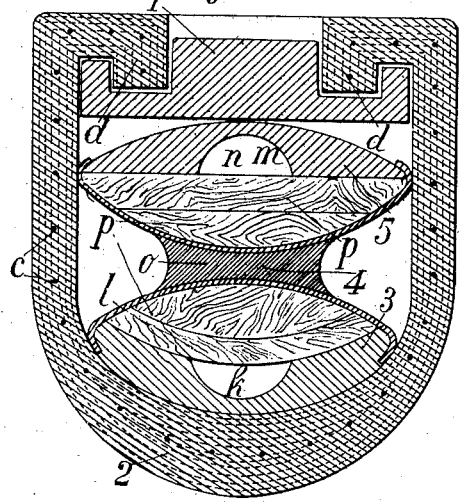
Fig. 3.
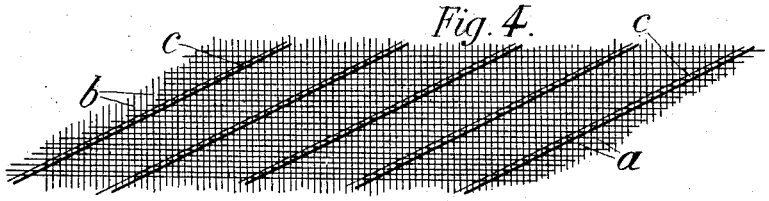
Fig. 4.
WITNESSES
H. M. Kuehne
John A. Percival
INVENTOR
Jules-Noel Dages
BY
ATTORNEYS No. 738,415. Patented September 8, 1903.

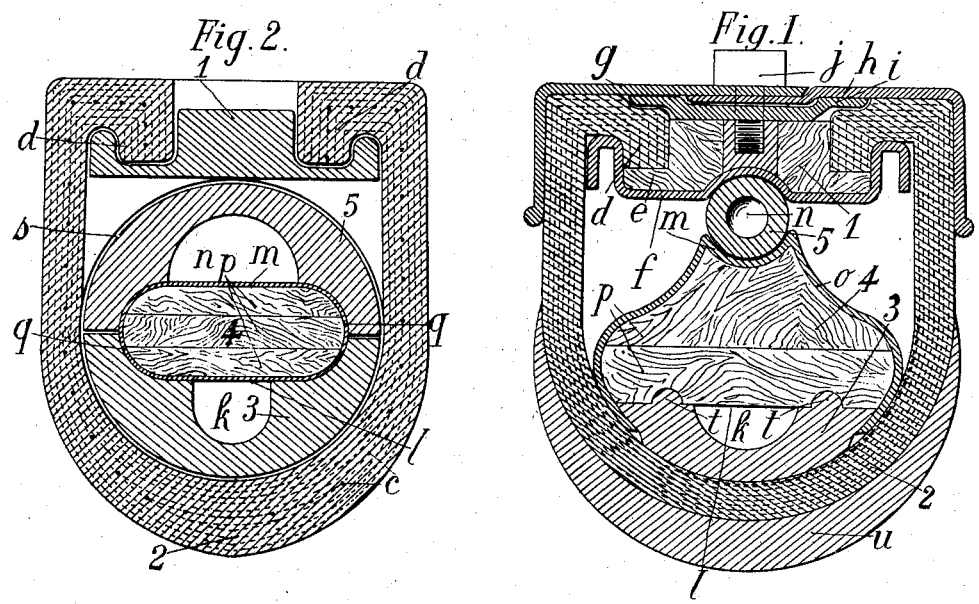

UNITED STATES PATENT OFFICE.

JULES NOËL DAGES, OF BRUSSELS, BELGIUM.

CUSHION-TIRE FOR VEHICLE-WHEELS.

SPECIFICATION forming part of Letters Patent No. 738,415, dated September 8, 1903.

Application filed April 18, 1903. Serial No. 153,225. (No model.)

*To all whom it may concern:*

Be it known that I, JULES NOËL DAGES, engineer, of 38 Rue du Marché, Brussels, in the Kingdom of Belgium, have invented a certain new and useful Improved Cushion-Tire for the Wheels of Vehicles; and I do hereby declare the following to be a full, clear, and exact description of the invention, such as will enable others skilled in the art to which it appertains to make and use the same.

The invention which is the subject of the present application for a patent refers to a new system for cushion-tires for the wheels of vehicles possessing all the advantages of pneumatic tires without their disadvantages caused by bursting and puncturing.

The tire is characterized by being made up of five portions—

First, a rigid felly or rim.

Second, a cover with fortified edges fitting into recesses in this rim and also held in place by securing-plates. Inside this cover between the interior surface of the tread of the wheel and the exterior surface of the rim there are three other portions which are numbered.

Third, an elastic cushion band capable of compression.

Fourth, a rigid ring resting on this latter.

Fifth, an elastic buffer-ring between the rigid band and the rim.

Figures 1, 2, and 3 of the accompanying drawings show as representative examples transverse sections of three practical forms for the carrying out of the invention. Fig. 4 is a plan of a piece of material for strengthening the cover.

In all the figures the five portions already mentioned, although represented in different forms of construction and constitution, are always indicated by the same numerals 1 2 3 4 5, in this order, that the identity of their functions in the three examples may be more easily perceived.

In all the forms of construction the cover 2 can be made like a pneumatic cover by a mixture of canvas and india-rubber; but I use for choice a specially-strong material in order to strengthen the middle portion of the cover. As is indicated in plan in Fig. 4, this material is composed of a tissue of threads $a$ and $b$, with which are interlaced obliquely at intervals metallic threads $c$, made of copper, German silver, or any other suitable metal. The cover 2, which may be provided with a tread $u$ of crescent section, is secured by fortified edges $d$, which fit into recesses in the rim 1. This rim may be of metal or wood made in a single piece, Figs. 2 and 3, or in two connected pieces $e$ and $f$, Fig. 1. The securing-rings $g$ $h$ and securing-plate $i$, which embrace the edges of the cover 2 and secure the same, are connected with one another and fastened to the rim by the screw $j$.

In contact with the inner surface of the cover 2, just within the tread, is situated a molded india-rubber ring 3, which contains in all cases a circumferential recess $k$. This cushion-ring surrounds the exterior periphery $l$ of a rigid ring 4, and between the interior periphery $m$ of this rigid ring, which has a transverse section which can be varied as required, and the rim 1 is interposed an elastic molded cushion 5, which serves the purpose of a buffer by means of a circumferential hollow $n$, which allows it to be more or less compressed. The portion 5 may consist merely of a hollow ring of thick material, as in the example of Fig. 1. The rigid portion 4 can be made entirely of wood or may consist of a metallic portion $o$, enveloping or inclosing wooden hoops $p$, Figs. 1 and 3, its inner and outer boundaries forming seatings for the portions 3 and 5. In the case when it is made entirely of wooden hoops these may be inclosed in an elastic or semi-elastic case $q$, as in the example of Fig. 2. In the example of Fig. 2 the three portions 3 4 5 may be, in order to make the fitting easier, first of all inclosed in a fabric $s$, forming a cover. On the interior surface of the portion 3 flanges or webs $t$ can be provided, which fit into corresponding channels in the hoop $p$ of the portion 4. While rolling, the vehicle being in motion, the portion 3 is more or less compressed. The weight of the vehicle is supported by the rigid portion 4, while the portion 5 acts as a buffer to protect the rim 1 from any jar or strain. In this way all appreciable jolting is prevented. Thus only the portion 3 and the tread $u$ of the cover 2 will undergo any wear and tear.

It is apparent that the shapes, details of assembling, and the construction of the five essential portions which constitute this system of cushion-tire just described can be varied without altering the principle of the invention.

I claim—

1. A cushion-tire for the wheels of vehicles characterized by the arrangement, within the hollow annular space inclosed by a rim 1 and a flexible cover 2, which latter is secured by fortified edges $d$, fitting into recesses in the rim 1, of three portions, a rigid ring 4 of metal, wood or both; an elastic portion or cushion 3, having a circumferential hollow $k$, placed between the exterior periphery of the ring 4 and the cover, and an elastic ring 5 having a circumferential hollow $n$ acting as a buffer between the interior periphery of the ring 4 and the rim 1.

2. In combination in a cushion-tire for vehicles, a rim, a flexible cover, a rigid ring 4 between said rim and cover, said ring 4 consisting of two metallic crowns and hoops seated therein; an elastic portion 3 between said ring 4 and the cover, and an elastic portion 5 between said ring 4 and the rim, substantially as described.

3. In combination in a cushion-tire for vehicles, a rim, a flexible cover, a rigid ring 4 between said rim and cover, said ring 4 consisting of two metallic crowns and hoops seated therein; an elastic portion 3 between said ring 4 and the cover, an elastic portion 5 between said ring 4 and the rim, and a cover $s$ inclosing said portions 3, 4 and 5, substantially as described.

4. In combination in a cushion-tire for vehicles, a rim, a cover, an elastic portion 3 adjacent said cover, an elastic portion 5 adjacent said rim and a rigid portion 4 between said portions 3 and 5, and a strengthening material embedded in said cover, said material consisting of a tissue into which is woven at intervals oblique metallic threads, inclined both to the warp and to the weft of the material.

In testimony whereof I have hereunto set my hand in the presence of two subscribing witnesses.

JULES NOËL DAGES.

Witnesses:
 GREGORY PHELAN,
 MAURICE GERBEAULT.